US006181810B1

United States Patent
Zhang et al.

(10) Patent No.: US 6,181,810 B1
(45) Date of Patent: Jan. 30, 2001

(54) METHOD AND APPARATUS FOR SPATIAL AND TEMPORAL FILTERING OF INTRAVASCULAR ULTRASONIC IMAGE DATA

(75) Inventors: Xiangmin Zhang; Tat-Jin Teo, both of Sunnyvale, CA (US)

(73) Assignee: SciMed Life Systems, Inc., Maple Grove, MN (US)

(*) Notice: Under 35 U.S.C. 154(b), the term of this patent shall be extended for 0 days.

(21) Appl. No.: 09/127,029

(22) Filed: Jul. 30, 1998

(51) Int. Cl.[7] ............................... G06D 9/00; A61B 8/14
(52) U.S. Cl. .................... 382/128; 382/260; 382/134; 600/437
(58) Field of Search .................. 382/134, 133, 382/131, 260, 128; 128/915, 916; 600/454, 468, 458, 465, 443, 455, 407, 437

(56) References Cited

U.S. PATENT DOCUMENTS

| 5,224,483 | * | 7/1993 | Lipschutz | 128/662.02 |
|---|---|---|---|---|
| 5,417,215 |  | 5/1995 | Evans et al. | 128/660.06 |
| 5,476,096 | * | 12/1995 | Olstad et al. | 128/660.07 |
| 5,520,185 | * | 5/1996 | Soni et al. | 128/661.08 |
| 5,522,392 | * | 6/1996 | Suorsa et al. | 128/661.08 |
| 5,876,343 | * | 3/1999 | Teo | 600/443 |
| 5,885,218 | * | 3/1999 | Teo et al. | 600/443 |

FOREIGN PATENT DOCUMENTS 0 571 084 A2    11/1993    (EP) ............................... G06F/15/68

* cited by examiner

Primary Examiner—Thomas G. Black
Assistant Examiner—Jacques Veillard
(74) Attorney, Agent, or Firm—Townsend and Townsend and Crew LLP

(57) ABSTRACT

A method and an apparatus are provided for combining spatial and temporal filtering for blood speckle reduction in high frequency ultrasound images wherein a sequence of image frames is processed to produce a binary mask. In this mask, a first value is assigned to regions of identified blood speckles and a second value is assigned to regions of the remainder. The images are then modulated with the mask, i.e., by applying different filtering techniques to assigned blood regions and assigned nonblood (i.e., tissue) regions, the filtering techniques having been selected to optimize images for the type of feature to be highlighted based on differences in frequency sensitivity between blood and tissue. The images are preferably in polar coordinate format. The degree of blood speckle suppression can be determined based on the actual values of the pixels at the same spatial location in given frames.

28 Claims, 4 Drawing Sheets

METHOD AND APPARATUS FOR SPATIAL AND TEMPORAL FILTERING OF INTRAVASCULAR ULTRASONIC IMAGE DATA

BACKGROUND OF THE INVENTION

This invention relates to intravascular ultrasonic imaging, particularly to data processing techniques for improving image perception.

With the increasing frequency (above 40 MHz) ultrasonic signals, blood speckles appear more prominently in ultrasonic intravascular images. The speckles are sufficiently bright to lower the contrast between blood and tissue, making it harder for physicians to determine the true boundaries based on a single frame images.

Most blood speckle reduction algorithms use either spatial or temporal information only, which is insufficient to determine the characteristic. See, for example, B. Olstad, "Noise reduction in ultrasound images using multiple linear regression in a temporal context", SPIE, vol. 1451, pp.269–281, 1991; Olstad, et al., "Analysis and measurement of temporal tissue variations", U.S. Pat. No. 5476096, 1995; and Karaman, et al., "An adaptive speckle suppression filter for medical ultrasonic imaging", IEEE Trans. Med. Imag., vol.14, pp.283–292, 1995.

Some algorithms have attempted to combine spatial and temporal filtering. However, they are so complex and cumbersome that processing cannot be realized in real-time with known technology. See, for example, Evans, et al., "Biased Motion-Adaptive Temporal Filtering for Speckle Reduction in Echocardiography", IEEE Trans. Med. Imag., vol.15, pp.39–50, 1996.

Tissue tends to be static over short periods of time. Blood cells move rapidly so blood speckles are randomly scattered. However, due to the fast cardiac motion and speckling nature of the high frequency ultrasound signals, it is difficult to differential blood and tissue without the consideration of additional information, such as spatial properties. What is needed is a near real-time technique for suppression of spurious dynamic artifacts.

SUMMARY OF THE INVENTION

According to the invention, a method and an apparatus are provided for combining spatial and temporal filtering for blood speckle reduction in high frequency ultrasound images wherein a sequence of image frames is processed to produce a binary mask, preferably a two-dimensional binary mask. In this mask, a first value is assigned to regions of identified blood speckles and a second value is assigned to regions of the remainder. The images are then modulated with the mask, applying different filtering techniques to assigned blood regions and assigned nonblood (i.e., tissue) regions, the filtering techniques having been selected to optimize images for the type of feature to be highlighted. The preferred filtering technique is a spectral analysis of transformed data so that the energy content of features changing at higher frequencies can be weighed against features changing at lower frequencies. The images are preferably in polar coordinate format. The degree of blood speckle suppression can be determined based on the actual values of the pixels at the same spatial location in given frames.

In a specific embodiment, the process of generating the mask involves obtaining a vector in each frame for the given frames at the same spatial location to produce a two-dimensional matrix, with the matrix then being transformed to the frequency domain to determine its characteristics. A binary label is derived and given to the pixel that is located at the center of the vector in the current frame, indicating whether it is blood speckle. Assuming the blood clutter and tissue are not isolated, a morphologic operator is applied to the first mask and then isolated labels are removed.

Once the mask is generated, different operations are performed on the original input frames. This is done on a pixel-by-pixel basis. For a pixel which is labeled as tissue, an average with the previous output value is used. For a pixel which is labeled as blood speckle, a minimum value is derived from values of this pixel in the given image frames.

The invention will be better understood by reference to the following detailed description in conjunction with the accompanying drawings.

DESCRIPTION OF SPECIFIC EMBODIMENTS

In order to efficiently combine spatial and temporal filtering, patterns should be identified in regions of interest generated by both the dimensions of time and of space. For example, a vector is obtained along the θ dimension from each image frame within a certain time window, the so called θ-Time filtering window. It has been discovered that, in the θ dimension, neighboring pixels have similar intensities in tissue, while they may appear to be more scattered in the blood area. Tissue regions and blood regions have been observed to exhibit spectral sensitivity in the both time dimension and the angle (θ) dimension, albeit differently. Blood exhibits greater reflectivity with higher frequency. These characteristics are useful for distinguishing blood and tissue in imaging.

Figure 1:
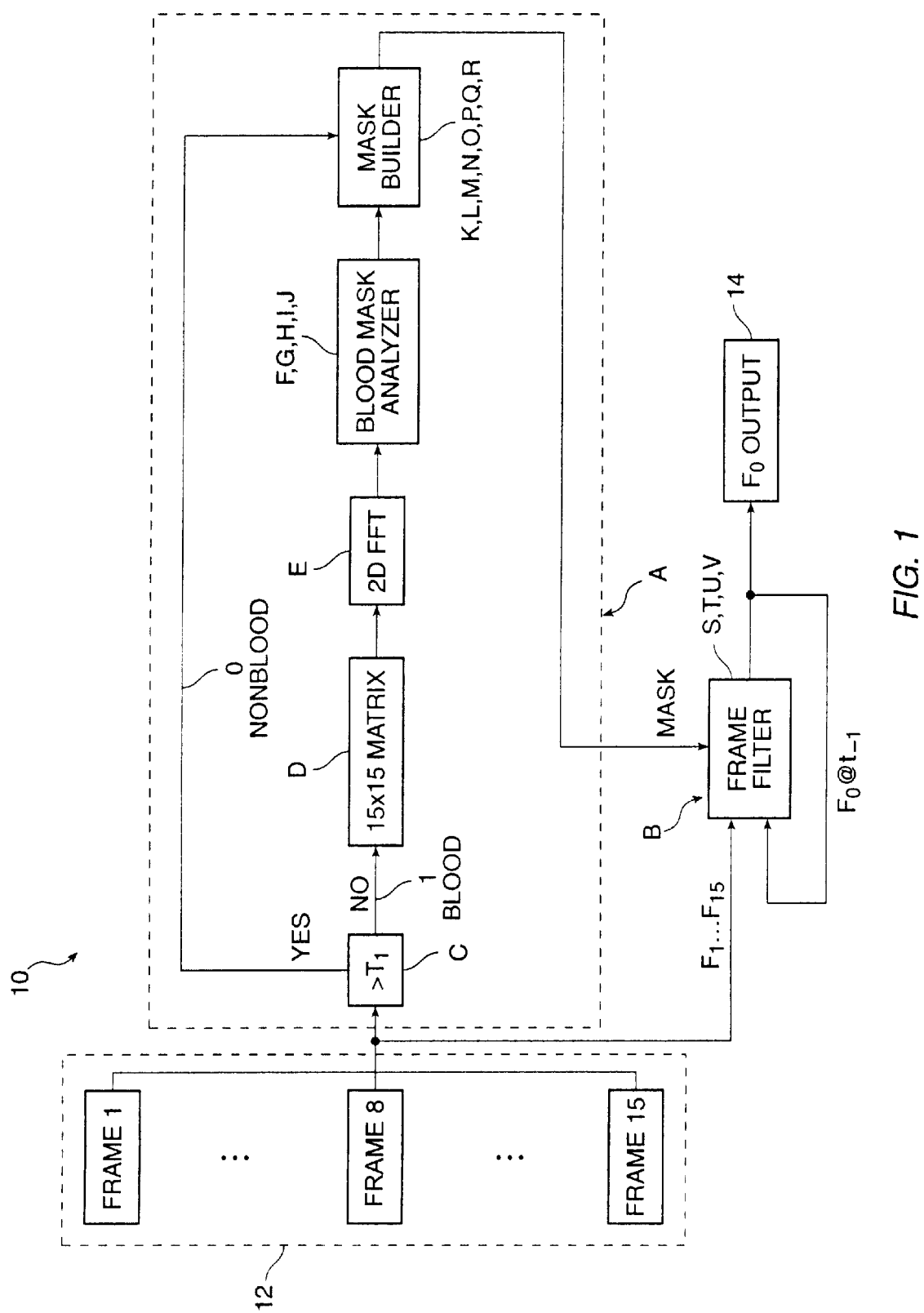
FIG. 1 is a block diagram of an apparatus according to the invention.

In the present invention, a specified number of consecutive frames is made available for digital analysis. FIG. 1 is a block diagram of an apparatus 10 according to the invention that illustrates an implementation. In this example, input is a sliding window 12 comprising fifteen image frames (F1, . . . , F15) which are processed together to generate one output frame (Fo) 14.

All images are in raw image data format whose pixel values represent the value at every r and θ coordinate.

Figure 2A:
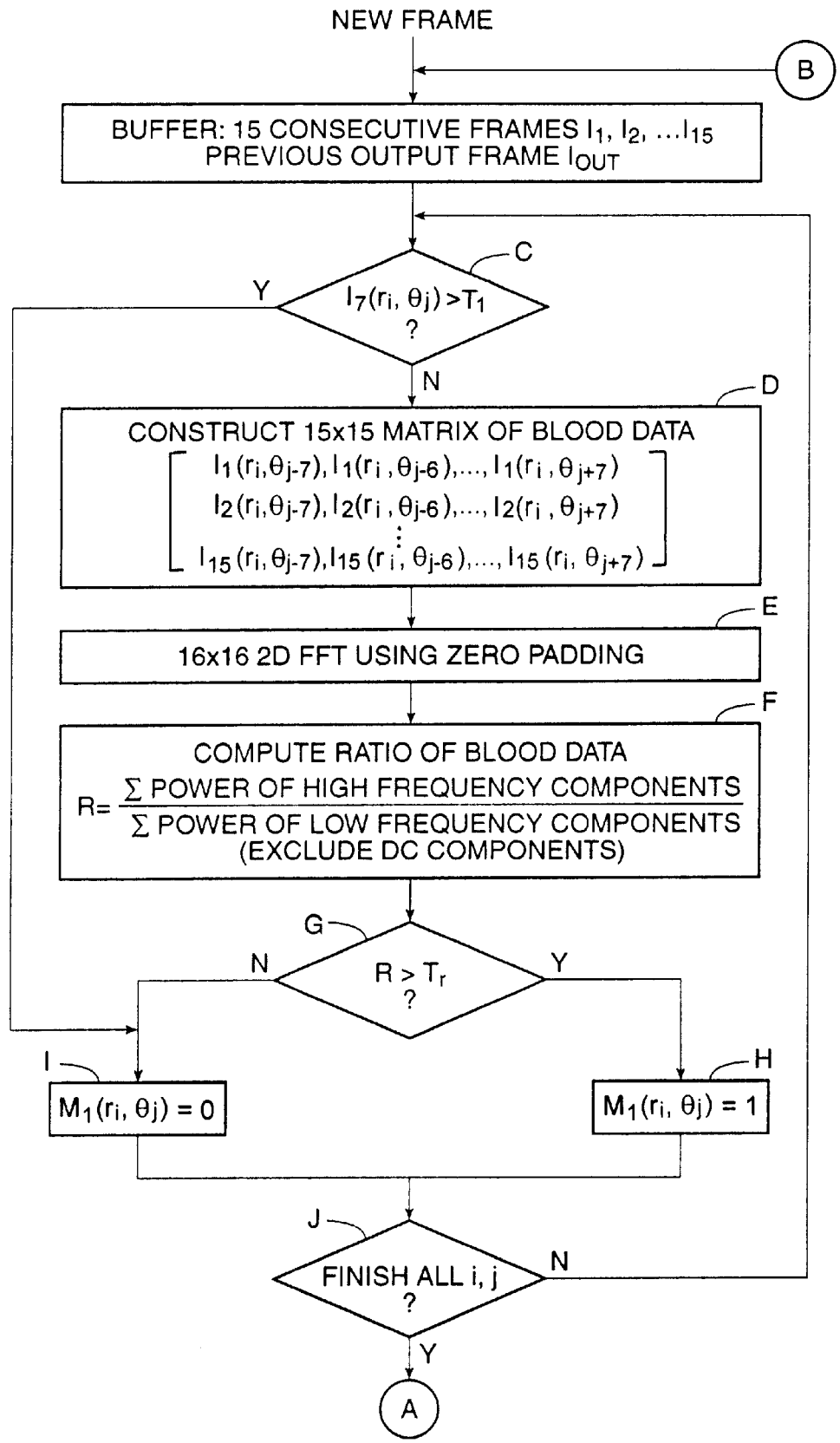
FIG. 2A is a flow chart of a first part of the process according to the invention.

Referring to the flow chart of FIG. 2A in connection with FIG. 1, the process to generate a blood speckle reduction frame includes two major steps:

A. For each frame generate a binary mask indicating blood regions (value 1) and non-blood regions (value 0) by comparison of an analyzed intensity value at each pixel in relation with previous frames and in relation to a adjacent pixels with a selected threshold intensity value.

B. Apply the mask obtained in Step A to a block of raw (original) frame data (F1–F15) and to the previous output frame (Fo @t-1)) to generate the new output frame (Fo).

In operation, an input buffer 12 containing the fifteen consecutive frames and the output frame is provided for storage.

In the first major step, each pixel in r and θ is examined for its characteristic intensity (Step C). For each pixel intensity I(r, θ) in the current frame (in this example, the center frame, Frame 8), if the pixel intensity is larger than a preset value T1, it is tentatively considered to be non-blood (tissue), and value 0 is assigned to the corresponding pixel. This is an indication that further gray scale analysis will not be required. Otherwise, value 1 is assigned as tentatively being blood, and an image intensity matrix M(r, θ) of 15×15 is formed (Step D), as hereinafter explained to further refine whether the pixel is of blood or nonblood. Specifically, each column of this matrix consists of a block of fifteen neighboring pixels in an angular (θ) direction in the same time frame. Each row consists of pixels at the same location in successive time frames. Hence, a matrix in space and time is formed.

In the example illustrated in FIG. 1, the interim 15x15 matrix is constructed in the form:

$$M(r,\theta)=[v1 v2 \ldots v14\ v15]$$

where $$vt=[I(r,\theta-7) \ldots I(r,\theta) \ldots I(r,\theta+7)]^T, t=1, 2, \ldots, 15$$

Figure 3:
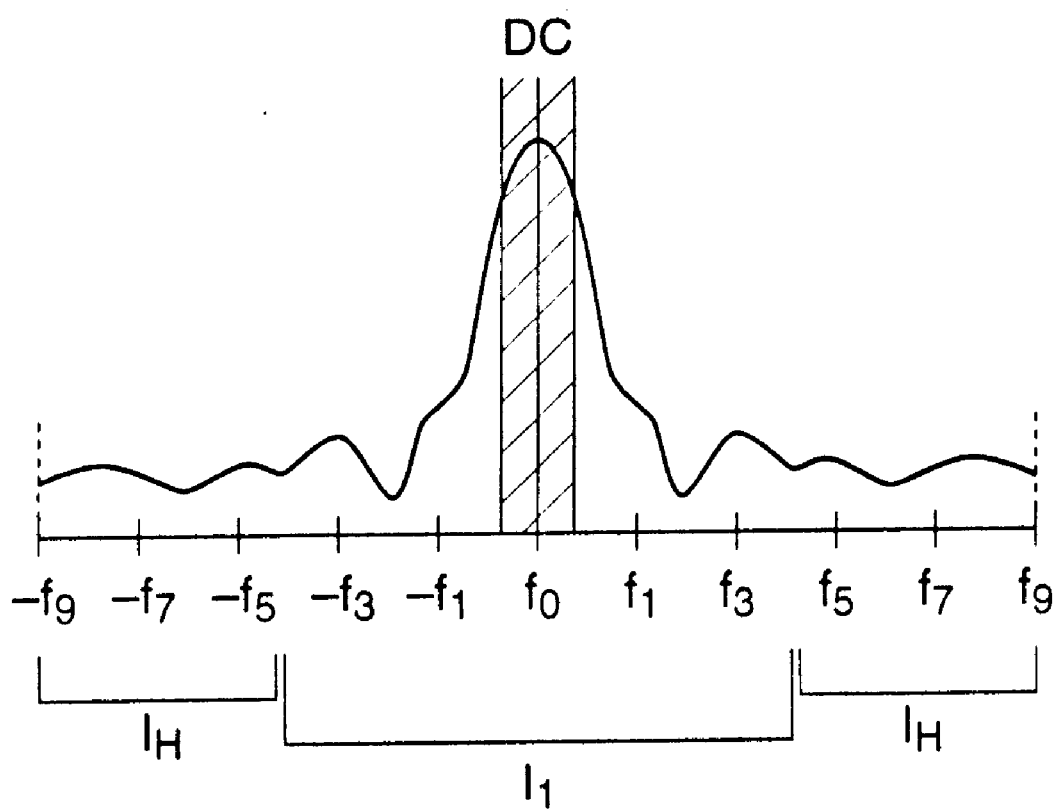
FIG. 3 is a spectral diagram of a fast Fourier transform of image data.

Signal processing operations can then be performed on matrix M(r,θ) to discriminate between tissue and blood in the region containing tissue. First, a two-dimensional 16×16 FFT of the matrix is computed, with zero padding on the last row and last column of the 15 by 15 matrix to 16 by 16 (Step E). Then, from the spectral results of the FFT, a spectral analysis is performed wherein a ratio is computed between the total power of high frequency components and the total power of low frequency components (excluding the DC component) (Step F). See FIG. 3 for a spectral diagram of the fast Fourier transform. While the transition between low frequency components and high frequency components is not precise, it can be selected for example to be at between the third and the fifth harmonic, the ratio of high frequency components to low frequency components tends to be sufficiently higher in a blood region than in a tissue region so that this ratio can be used as a metric. If the ratio R is greater than a dimensionless threshold Tr (Step G), the position in the matrix M is set to 1 and identified as blood (Step H). If the ratio R is less than the threshold Tr, the position in the matrix M is set to 0 and identified for further processing (Step I). The process is repeated for each pixel location {i,j} (Step J). Because tissue at a distance from the center of a region reacts more like a blood region in the spectral domain, this method is useful for detecting a tissue ring that encloses a blood pool.

Figure 2B:
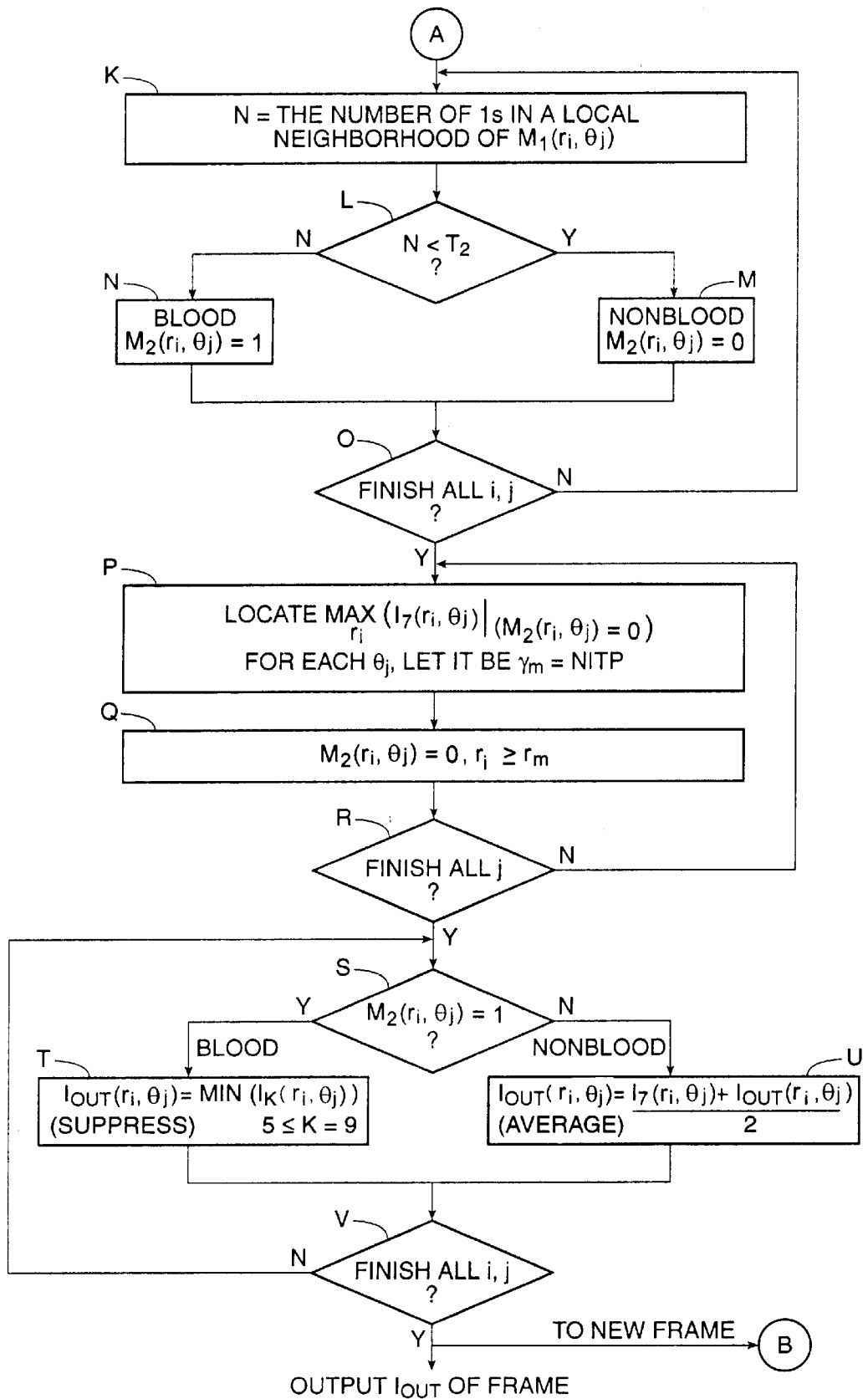
FIG. 2B is a flow chart of a second part of the process according to the invention.

Further processing is needed to produce a reliable binary mask separating tissue (nonblood) and blood. First, a technique is used to remove pixels tentatively but falsely identified as blood based on a count of blood-designated pixels in the neighborhood. This technique is based on the knowledge that blood regions are known to be relatively large and cannot be isolated points. Referring to FIG. 2B, for each pixel, the number of neighboring pixels with label as blood is counted (Step K) and if the number is substantially small (Step L), this pixel is labeled as tissue (Step M). Otherwise it is labeled as blood (Step N). This process is repeated for each pixel {i,j} (Step O).

Second, each radial direction is scanned for maximum intensity of the tissue point (rm or MITP) in this radial direction (Step P). Based on the assumption that blood pools are surrounded by tissue, all pixels after, or further away than, the MITP are labeled as tissue (set to zero) (Step Q). This is repeated for all coordinates of j, the radial direction (Step R). The mask is thus built (Step A).

The next steps (comprising Step B) yield the so-called filtered frame, wherein each pixel value in the output is derived from the following: for every point M(r, θ) in M, if its value is 1 (Step S), this point is characterized as blood and needs to be suppressed. For example, the corresponding point in the output is set to the minimum value of I(r, θ) in all frames or subset of frames (e.g., 5 frames) (Step T). Otherwise, for a tissue point, where the value is 0, an average of the original intensity value and the intensity of the same point in the previous output frame can be used as the output value (Step U). These assignments or calculations are carried out for every pixel location {i,j}. (Step V).

This invention has numerous advantages. This approach can enhance the edge between lumen (blood) and vessel wall (tissue), providing a clearer border definition in an intravascular ultrasonic imaging system. This spatial and temporal analysis of the interior of a vascular region using signal processing techniques enhances the identifiable image distinction between blood and tissue. This approach is more efficient in that it combines a time dimension with only one spatial dimension, and so it need not involve higher dimensional analysis.

The invention has been explained with reference to specific embodiments. Other embodiments will be evident to those of ordinary skill in the art. It is therefore not intended that this invention be limited, except as indicated by the appended claims.

What is claimed is:

1. A method for combined spatial and temporal real-time filtering of ultrasonic image data in a contained zone in order to identify non-blood (tissue) and blood comprising:
    (a) generating a binary two-dimensional mask indicating both blood regions and non-blood regions in a center frame in time of a sequence of consecutive frames within a certain time window, each such frame comprising intensity data in at least two spatial dimensions, the step of generating a binary two-dimensional mask comprising:
        (i) transforming a two-dimensional array of intensity data for the sequence of consecutive frames into a two-dimensional frequency domain, the two-dimensional array comprising a spatial dimension and a temporal dimension; and
        (ii) analyzing the resulting two-dimensional frequency transform to denominate certain pixels as blood regions; and
    (b) filtering the center frame by applying said binary mask to a two-dimensional block of frame data including unprocessed frame data for the center frame and adjacent frames in sequence, and processed frame data of a prior output frame, in order to obtain a new output frame.

2. The method according to claim 1 wherein said analyzing step comprises
    comparing the power of high-frequency components of the resulting two-dimensional frequency transform with the power of lower frequency components to denominate pixels where the ratio of the high-frequency power to low-frequency power exceeds a predetermined value as blood regions.

3. The method according to claim 2 wherein said filtering step comprises:
    suppressing intensity values of blood region pixels; and
    averaging over time and space intensity values of non-blood region pixels.

4. The method according to claim 2 wherein the low-frequency components include harmonics below and including the third harmonic but do not include the DC component, and the high-frequency components include harmonics above the third harmonic.

5. The method according to claim 1 wherein said filtering step comprises:
   suppressing intensity values of blood region pixels; and
   averaging over time and space intensity values of non-blood region pixels.

6. The method according to claim 5 wherein said filtering step further comprises:
   identifying points of maximum intensity along radials of non-blood regions; and
   designating points along said radials beyond said points of maximum intensity as non-blood regions.

7. The method according to claim 1 wherein said analyzing step is performed for all pixels in said tentative blood regions within non-blood regions.

8. The method according to claim 1 wherein each such frame comprises intensity data in plane polar coordinates (r, θ) and the two-dimensional array of intensity data for the sequence of consecutive frames comprises a time dimension and the angular dimension θ.

9. The method according to claim 1 wherein the step of transforming a two-dimensional array of intensity data comprises performing a fast Fourier transform.

10. The method according to claim 1 wherein the step of generating a binary two-dimensional mask further comprises identifying tentative blood and non-blood regions in the center frame before transforming the two-dimensional array of intensity data into the frequency domain.

11. The method according to claim 10 wherein the step of identifying tentative blood and non-blood regions in the center frame comprises comparing the intensity of each pixel of the center frame against a predetermined value, identifying such pixel as a non-blood region if its intensity exceeds the predetermined value and identifying it as a blood region otherwise.

12. A method for combined spatial and temporal real-time filtering of ultrasonic image data in a contained zone in order to identify non-blood (tissue) and blood comprising:
   (a) generating a binary mask indicating both blood regions and non-blood regions in a center frame in time of a sequence of consecutive frames within a certain time window, each such frame comprising intensity data in at least two spatial dimensions, the step of generating a binary two-dimensional mask comprising:
      (i) comparing the intensity of each pixel of the center frame against a predetermined value, tentatively identifying such pixel as a non-blood region if its intensity exceeds the predetermined value and tentatively identifying it as a blood region otherwise;
      (ii) transforming a two-dimensional array of intensity data for the sequence of consecutive frames into a two-dimensional frequency domain, the two-dimensional array comprising a spatial dimension and a temporal dimension; and
      (iii) comparing high-frequency components of the resulting two-dimensional frequency transform with lower frequency components to denominate pixels with more higher frequency components as blood regions; and
   (b) filtering the center frame by applying said binary mask to a two-dimensional block of frame data including unprocessed frame data for the center frame and adjacent frames in sequence, and processed frame data of a prior output frame, in order to obtain a new output frame, said filtering step comprising:
      (i) suppressing intensity values of blood region pixels;
      (ii) averaging over time and space intensity values of non-blood region pixels;
      (iii) identifying points of maximum intensity along radials of non-blood regions; and
      (iv) designating points along said radials beyond said points of maximum intensity as non-blood regions.

13. An apparatus for combined spatial and temporal real-time filtering of ultrasonic image data of a contained zone in order to identify non-blood (tissue) and blood comprising:
   (a) a binary two-dimensional mask generator for indicating both blood regions and non-blood regions in a center image frame in time of a sequence of consecutive frames within a certain time window, each such frame comprising intensity data in at least two spatial dimensions; and
   (b) a blood/non-blood filter applying said binary mask on a block of frame data including unprocessed frame data for the center frame and adjacent frames in sequence, and processed frame data for a prior output frame, in order to obtain a center output frame identifying blood regions and non-blood regions;
   said binary two-dimensional mask generator comprising:
      (i) a signal transformer for converting a two-dimensional array of intensity data for the sequence of consecutive frames into a two-dimensional frequency domain, the two-dimensional array comprising a spatial dimension and a temporal dimension;
      (ii) means for computing a ratio of the power of higher frequency components to lower frequency components of the resulting two-dimensional frequency transform; and
      (iii) comparator means for comparing said ratio to a threshold ratio in order to distinguish between blood regions and non-blood regions on a spectral basis in the two-dimensional frequency domain; and
   said blood/non-blood filter comprising:
      (i) means for suppressing intensity values of the blood region pixels;
      (ii) means for averaging, over time and space, intensity values of non-blood region pixels;
      (iii) means for generating from said averaged intensity values of said non-blood region pixels and from said blood region pixels having suppressed intensity values, an output frame identifying blood regions and exhibiting said averaged intensity values of said non-blood region.

14. An apparatus for combined spatial and temporal real-time filtering of ultrasonic image data of a contained zone in order to identify non-blood (tissue) and blood comprising:
   (a) a binary two-dimensional mask generator for indicating both blood regions and non-blood regions in a center image frame in time of a sequence of consecutive frames within a certain time window, each such frame comprising intensity data in at least two spatial dimensions, said generator comprising:
      (i) a signal transformer for converting a two-dimensional array of intensity data for the sequence of consecutive frames into a two-dimensional frequency domain, the two-dimensional array comprising a spatial dimension and a temporal dimension; and (ii) an analyzer for denominating certain pixels as blood regions according to the resulting two-dimensional frequency transform; and (b) a blood/non-blood filter applying said binary mask on a block of frame data including unprocessed frame data for the center frame and adjacent frames in sequence, and processed frame data for a prior output frame, in order to obtain a center output frame identifying blood regions and non-blood regions.

15. The apparatus according to claim 14 wherein said analyzer comprises:

means for computing a ratio of the power of higher frequency components to lower frequency components of the resulting two-dimensional frequency transform; and comparator means for comparing said ratio to a threshold ratio in order to distinguish between blood regions and non-blood regions on a spectral basis in the two-dimensional frequency domain.

16. The apparatus according to claim 14 wherein said blood/non-blood filter comprises:

means for suppressing intensity values of the blood region pixels;

means for averaging, over time and space, intensity values of non-blood region pixels; and means for generating from said averaged intensity values of said non-blood region pixels and from said blood region pixels having suppressed intensity values, an output frame identifying blood regions and exhibiting said averaged intensity values of said non-blood regions.

17. The apparatus according to claim 16 wherein said blood/non-blood filter further comprises:

means responsive to location and intensity of pixels for locating a point of maximum intensity along each radial of the non-blood regions; and means for designating lengths along each said radial beyond each said point of maximum intensity as non-blood regions.

18. The apparatus according to claim 14 wherein said analyzer comprises:

a ratio-computation module for computing the power of higher frequency components to lower frequency components of the resulting two-dimensional frequency transform; and a comparator for comparing said ratio to a threshold ratio in order to distinguish between blood regions and non-blood regions on a spectral basis in the two-dimensional frequency domain.

19. The apparatus according to claim 18 wherein the lower frequency components include harmonics below and including the third harmonic but do not include the DC component, and the higher frequency components include harmonics above the third harmonic.

20. The apparatus according to claim 14 wherein said blood/non-blood filter comprises:

an intensity-suppression module for suppressing intensity values of the blood region pixels;

an averaging module for averaging intensity values of non-blood region pixels over time and space; and an output-generation module for generating from said averaged intensity values of said non-blood region pixels and from said blood region pixels having suppressed intensity values, an output frame identifying blood regions and exhibiting said averaged intensity values of said non-blood regions.

21. The apparatus according to claim 20 wherein said blood/non-blood filter further comprises:

an intensity-identification module responsive to location and intensity of pixels for locating a point of maximum intensity along each radial of the non-blood regions; and a length-designation module for designating lengths along each said radial beyond each said point of maximum intensity as non-blood regions.

22. The apparatus according to claim 14 wherein each such frame comprises intensity data in plane polar coordinates $(r,\theta)$ and the two-dimensional array of intensity data for the sequence of consecutive frames comprises a time dimension and the angular dimension $\theta$.

23. The apparatus according to claim 14 wherein the signal transformer for converting a two-dimensional array of intensity data uses a fast Fourier transform.

24. The apparatus according to claim 14 wherein the generator further comprises an identification unit for making tentative assignments of blood and non-blood regions in the center frame before the signal transformer converts the two-dimensional array of intensity data.

25. The apparatus according to claim 24 wherein said identification unit makes such tentative assignments of blood and non-blood regions by comparing the intensity of each pixel of the center frame against a predetermined value, assigning such pixel as a non-blood region if its intensity exceeds the predetermined value and assigning such pixel as a blood region otherwise.

26. An apparatus for combined spatial and temporal real-time filtering of ultrasonic image data of a contained zone in order to identify non-blood (tissue) and blood comprising:

(a) a binary two-dimensional mask generator for indicating both blood regions and non-blood regions in a center image frame in time of a sequence of consecutive frames within a certain time window, each such frame comprising intensity data in at least two spatial dimensions; and (b) a blood/non-blood filter applying said binary mask on a block of frame data including unprocessed frame data for the center frame and adjacent frames in sequence, and processed frame data for a prior output frame, in order to obtain a center output frame identifying blood regions and non-blood regions;

said binary two-dimensional mask generator comprising:

(i) a signal transformer for converting a two-dimensional array of intensity data for the sequence of consecutive frames into a two-dimensional frequency domain, the two-dimensional array comprising a spatial dimension and a temporal dimension;

(ii) a ratio-computation module for computing the power of higher frequency components to lower frequency components of the resulting two-dimensional frequency transform; and (iii) a comparator for comparing said ratio to a threshold ratio in order to distinguish between blood regions and non-blood regions on a spectral basis in the two-dimensional frequency domain; and said blood/non-blood filter comprising:

(i) an intensity suppression module for suppressing intensity values of the blood region pixels;

(ii) an averaging module for averaging intensity values of non-blood region pixels over time and space; and (iii) an output-generation module for generating from said averaged intensity values of said non-blood region pixels and from said blood region pixels having suppressed intensity values, an output frame identifying blood regions and exhibiting said averaged intensity values of said non-blood regions.

27. A method for generating a binary two-dimensional mask for use in combined spatial and temporal real-time filtering of ultrasonic image data in a contained zone in order to identify non-blood (tissue) and blood comprising:

(a) transforming a two-dimensional array of intensity data for a sequence of consecutive frames within a certain time window into a two-dimensional frequency domain, wherein each such frame comprises intensity data in at least two spatial dimensions and the two-dimensional array comprises a spatial dimension and a temporal dimension; and (b) analyzing the resulting two-dimensional frequency transform to denominate certain pixels as blood regions.

28. A binary two-dimensional mask generator for use in combined spatial and temporal real-time filtering of ultrasonic image data of a contained zone in order to identify non-blood (tissue) and blood comprising:

(a) a signal transformer for converting a two-dimensional array of intensity data for a sequence of consecutive frames within a certain time window into a two-dimensional frequency domain, wherein each such frame comprises intensity data in at least two spatial dimensions and the two-dimensional array comprises a spatial dimension and a temporal dimension; and (b) an analyzer for denominating certain pixels as blood regions according to the resulting two-dimensional frequency transform.

* * * * *